United States Patent
Hall

(10) Patent No.: US 6,993,624 B2
(45) Date of Patent: Jan. 31, 2006

(54) METHOD AND APPARATUS FOR SELECTING ENQUEUED DATA ACCESS OPERATIONS FOR EXECUTION IN A DISK DRIVE DATA STORAGE DEVICE

(75) Inventor: David Robison Hall, Rochester, MN (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 342 days.

(21) Appl. No.: 10/285,256

(22) Filed: Oct. 31, 2002

(65) Prior Publication Data

US 2004/0088478 A1 May 6, 2004

(51) Int. Cl.
*G06F 12/00* (2006.01)

(52) U.S. Cl. ........................................ 711/112; 711/111
(58) Field of Classification Search ................. 711/111, 711/112, 113; 360/77.04, 48, 78.07; 714/2
See application file for complete search history.

(56) References Cited

U.S. PATENT DOCUMENTS 5,991,825 A * 11/1999 Ng .................................. 710/6
6,515,819 B1 * 2/2003 Schmidt et al. .......... 360/78.04
6,763,430 B1 * 7/2004 Camp .......................... 711/112

OTHER PUBLICATIONS

U.S. Appl. No. 09/638,253, entitled "Space–Efficient Expected Access Time Algorithm for Hard Disk Drive Command Queue Ordering," filed Aug. 14, 2000, by Espeseth et al.
U.S. Appl. No. 10/215,403, entitled "Method and System for Efficiently Calculating and Storing Expected Access Time Information for DASD," filed Aug. 8, 2002, by Hall.

* cited by examiner

*Primary Examiner*—Mano Padmanabhan
*Assistant Examiner*—Duc T Doan
(74) *Attorney, Agent, or Firm*—Chambliss, Bahnet & Stophel; David W. Lynch

(57) ABSTRACT

In accordance with one aspect of the present invention, a seek profile table used by a disk controller contains multiple profiles for seek operations, and is accessed by a separate index table containing, for each permutation of key parameters, an index to a corresponding profile. In operation, the estimated seek time for an enqueued data access operation is obtained by accessing the applicable index table entry, using the value of the index entry to determine the corresponding profile, and using the profile to estimate the access time. Preferably, a "time-based relocation expected access time" algorithm is used, in which a nominal seek time is established, and profile table entries express a probability that an operation with a given latency above the nominal seek time will complete within the latency period. The expected access time is the latency plus the product of this probability and the time cost of a miss, i.e., the time of a single disk revolution.

17 Claims, 8 Drawing Sheets

225

| SEEK TIME 301 | SEEK LENGTH 302 |
|---|---|
| 0 | 0 |
| 1 | 2 |
| 2 | 5 |
| 3 | 9 |
| ⋮ | ⋮ |

FIG. 3

| HEAD/DIRECTION/OP TYPE | TARGET CYLINDER RANGE | | |
| --- | --- | --- | --- |
| | 0-(R-1) | R-(2R-1) | (M-1)R-(MR-1) |
| H1/IN/R | 1 | 1 | 5 |
| H1/IN/W | 6 | 7 | 8 |
| H1/OUT/R | 4 | 4 | 3 |
| H1/OUT/W | 9 | 12 | 10 |
| H2/IN/R | 3 | 1 | 11 |
| H2/IN/W | 7 | 7 | 13 |
| ... | | | |
| HN/OUT/W | 12 | 8 | 10 |

FIG. 4

METHOD AND APPARATUS FOR SELECTING ENQUEUED DATA ACCESS OPERATIONS FOR EXECUTION IN A DISK DRIVE DATA STORAGE DEVICE

CROSS REFERENCE TO RELATED APPLICATION

The present invention is related to the following commonly owned copending U.S. patent applications, which are herein incorporated by reference:

Ser. No. 10/215,403, filed Aug. 8, 2002, by Hall, entitled "Method and System for Efficiently Calculating and Storing Expected Access Time Information for DASD".

Ser. No. 09/638,253, filed Aug. 14, 2000, by Espeseth et al., entitled "Space-Efficient Expected Access Time Algorithm for Hard Disk Drive Command Queue Ordering".

FIELD OF THE INVENTION

The present invention relates to rotating disk data storage devices, and in particular, to algorithms used for selecting the order of execution of multiple enqueued data access operations in a disk data storage device.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

The extensive data storage needs of modern computer systems require large capacity mass data storage devices. While various data storage technologies are available, the rotating magnetic rigid disk drive has become by far the most ubiquitous. Such a disk drive data storage device is an extremely complex piece of machinery, containing precision mechanical parts, ultra-smooth disk surfaces, high-density magnetically encoded data, and sophisticated electronics for encoding/decoding data, and controlling drive operation. Each disk drive is therefore a miniature world unto itself, containing multiple systems and subsystem, each one of which is needed for proper drive operation. Despite this complexity, rotating magnetic disk drives have a proven record of capacity, performance and cost which make them the storage device of choice for a large variety of applications.

A disk drive typically contains data recorded in multiple sectors located on concentric tracks on the surface of one or more flat disks, which rotate at a constant speed. In order to access data (read data from the disk or write data to the disk), a moveable actuator positions a transducer adjacent a desired data track. The drive then waits until the disk rotates to an angular position in which the desired data sector is directly adjacent the transducer. The time required for the disk drive to execute any given data access operation therefore includes the time required to move the actuator from its current position to the desired track position (referred to as a seek) and the time required to wait until the disk rotates to the desired angular position (referred to as latency). The execution time also includes the time required to actually read or write the data once the actuator is properly positioned, but experience has shown that for many operating environments, the amount of data accessed in each operation is relatively small, and that the seek and latency times are more significant than the time required to read or write the data.

In order to keep up with advances in other areas of digital data processing technology, disk drive storage devices must make continual improvements in performance, reliability and data capacity. Performance may be measured as the average number of data access operations per unit time, which depends on the average seek time and average latency time. Seek time can be reduced by designing faster, more powerful actuators and latency can be reduced by spinning the disk at a higher velocity, but there are design constraints which impose practical limits to the improvements that can be obtained by these means.

For a given mechanical design and data formatting, it is possible to obtain still further improvement by intelligently ordering the data access operations. Specifically, it will be observed that the seek time and latency time for a given data access operation are not absolute, but are dependent, among other things, on the current position of the actuator (which affects the length of the seek) and current angular position of the disk (which affects latency). Typically, multiple data access operations are enqueued in an internal command buffer in the disk drive. By intelligently selecting the order of execution of these data access operations, it is possible to choose operations such that the average seek and access times are reduced. Thus, although the actuator speed and other characteristics are not changed, the average seek time is reduced because operations are ordered such that the average length of the seek is reduced. Similarly, although the rotational speed of the disk is not changed, the average latency is reduced because operations are ordered such that, after completing the seek, the average angle of rotation of the disk until reaching the desired data is reduced.

Various techniques have been used to take advantage of these characteristics by intelligently selecting the order of execution of enqueued data access operations. In general, these algorithms estimate, for each of multiple enqueued data access operations, the amount of time required for seek and latency from the actuator position at the end of an Nth access operation to the beginning of the enqueued data access operation, and select one of the enqueued data access operations for execution as the (N+1)th operation on the basis of these estimates.

Optimal performance of the ordering algorithm depends on the accuracy of the estimates, and in particular, the accuracy of the seek time estimate. If the seek time estimate is too low, the algorithm may select a data access operation for which the actuator can not settle on the desired track in time, causing the actuator to wait a full revolution of the disk on the track until the desired data is available. If the seek time estimate is too high, the algorithm will reject some operations having very little latency but which could have been performed in favor of slower operations having greater latency after the seek.

Obtaining accurate seek time estimates is difficult because seek time is dependent on so many variables, and the required speed of disk drive operation means that any seek estimation technique must execute very rapidly. Conventional algorithms have estimated seek time based on the length of seek and whether the next operation is a read or a write (the write generally requiring greater track following accuracy, and hence a longer seek time before settling on the track). But other factors may affect seek time. Actuator speeds (and hence seek time) are not necessarily the same for all radial zones of the disk or for both seek directions. Normal manufacturing process variations in each individual head, actuator, disk, and other components mean that the seek time characteristics will not only vary from one disk drive device to another of the same model and manufacturer, but that even within a single drive, the seek time characteristics will vary from one data recording surface to another. Moreover, seek time within any particular drive can change as the drive ages, or as the temperature varies.

A need exists for improved techniques for scheduling data access operations, and in particular, for improved techniques for estimating seek time of multiple enqueued data access operations.

SUMMARY OF THE INVENTION

In accordance with one aspect of the present invention, a seek profile table used by a disk controller contains multiple entries, each entry corresponding to a respective seek profile. A separate index table contains multiple entries, each entry corresponding to a respective combination of parameters affecting the seek profile, the number of index table entries substantially exceeding the number of profile entries. Each index table entry contains a single reference to a corresponding entry in the profile table which approximates the seek profile under the combination of parameters corresponding to the index table entry. In operation, the estimated seek time for an enqueued data access operation is obtained by accessing the index table entry corresponding to the applicable parameters of the enqueued data access operation, using the value of the index entry to determine the corresponding profile table entry, and using a probability profile from the profile table entry to estimate the access time.

In the preferred embodiment, a "time-based relocation expected access time" (TREAT) algorithm is used. A nominal seek profile is established which sets a minimum possible seek time for each seek length. Time is expressed as an integral number of servo identifiers (SIDs) on the disk surface passing the transducer head. For any given seek operation, there will be a latency after the nominal seek. Each seek probability profile table entry contains multiple fields, each field corresponding to a respective probability that a data access operation can complete. The value in each respective field of the seek probability profile expresses the latency time following the nominal seek time (expressed as an integral number of SIDs) which is required to achieve the corresponding probability that a data access operation will complete within that latency time. However, it would alternatively be possible to use other algorithms, in which the representation of the probability profile in a seek probability profile table entry is expressed in a different form.

In the preferred embodiment, there is a separate index table entry corresponding to each combination of disk head number, direction of seek, and whether the operation is a read or write operation. However, it would alternatively be possible to use other or additional parameters, such as the cylinder (track) being accessed, or the temperature of the drive.

In the preferred embodiment, seek probability profile table entries are loaded with a representative set of profile entries, and each respective index table entries is dynamically mapped to a closes match in the seek probability profile table according to actual operating conditions. It would alternatively be possible to adaptively construct seek probability profile table entries using actual operating statistics, or to construct the tables using other means.

Using a seek probability profile table and index table in accordance with the preferred embodiment makes it possible to effectively take into account variations among individual heads, seek direction, and other parameters, without the need for massive tables to store separate profiles for each possible permutation of relevant parameters, and without the need for complex calculations performed in real time, thus supporting more accurate estimates of access time for enqueued operations.

The details of the present invention, both as to its structure and operation, can best be understood in reference to the accompanying drawings, in which like reference numerals refer to like parts, and in which:

BRIEF DESCRIPTION OF THE DRAWING

FIG. 3 illustrates the general structure of a nominal seek time table for estimating access times of enqueued operations, according to the preferred embodiment.

FIG. 4 illustrates the general structure of an index table for estimating access times of enqueued operations, according to the preferred embodiment.

DETAILED DESCRIPTION OF THE PREFERRED EMBODIMENT

Overview of Disk Drive Design

Figure 1:
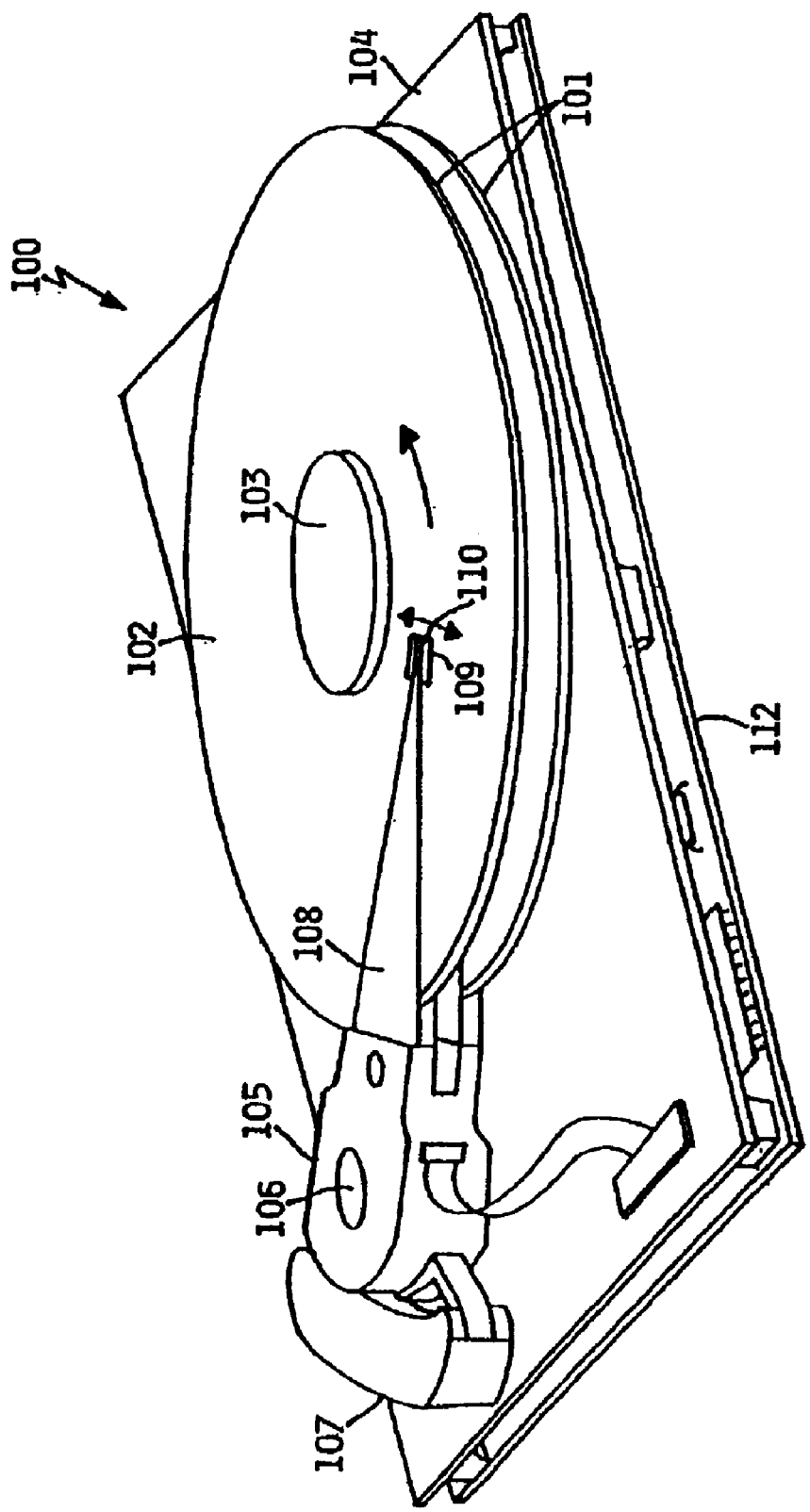
FIG. 1 is a simplified representation of a rotating magnetic disk drive storage device, for use in accordance with the preferred embodiment of the present invention.

A rotating rigid magnetic disk drive typically contains one or more smooth, flat disks which are permanently attached to a common spindle or hub. Where more than one disk is used, the disks are stacked on the spindle parallel to each other and spaced apart so that they do not touch. The disks and spindle are rotated in unison at a constant speed by a spindle motor.

The spindle motor is typically a brushless DC motor having a multi-phase electromagnetic stator and a permanent magnet rotor. The different phases of the stator are sequentially driven with a drive current to rotate the rotor.

Each disk is formed of a solid disk-shaped base or substrate, having a hole in the center for the spindle. The substrate is commonly aluminum, although glass, ceramic, plastic or other materials are possible. The substrate is coated with a thin layer of magnetizable material, and may additionally be coated with a protective layer.

Data is recorded on the surfaces of the disk or disks in the magnetizable layer. To do this, minute magnetized patterns representing the data are formed in the magnetizable layer. The data patterns are usually arranged in circular concentric tracks, although spiral tracks are also possible. Each track is further divided into a number of sectors. Each sector thus forms an arc, all the sectors of a track completing a circle.

A moveable actuator positions a transducer head adjacent the data on the surface to read or write data. The actuator may be likened to the tone arm of a phonograph player, and the head to the playing needle. There is one transducer head for each disk surface containing data. The actuator usually pivots about an axis parallel to the axis of rotation of the disk(s), to position the head. The actuator typically includes a solid block surrounding the axis having comb-like arms extending toward the disk (which is, for this reason, sometimes referred to as the "comb"); a set of thin suspensions attached to the arms, and an electro-magnetic motor on the opposite side of the axis. The transducer heads are attached to the end of the suspensions opposite the comb, one head for each suspension. The actuator motor is typically an electro-magnetic coil mounted on the actuator comb and a set of permanent magnets mounted in a stationary position on the base or cover; when energized, the coil imparts a torque to the comb in response to the magnetic field created by the permanent magnets. The actuator motor rotates the actuator to position the head over a desired data track (a seek operation). Once the head is positioned over the track, the constant rotation of the disk will eventually bring the desired sector adjacent the head, and the data can then be read or written. The time spent waiting after completion of the seek until the desired sector is adjacent the head is known as latency, and thus the time required to commencement of a data access operation is the sum of seek and latency times.

Typically, a servo feedback system is used to position the actuator. Servo fields identifying the data tracks are written on at least one disk surface, usually at the time of manufacture. Older disk drive designs often employed a dedicated disk surface for servo fields. Newer designs typically use embedded servo sectors, i.e., servo sectors are recorded at angularly spaced portions of each disk surface, the area between servo sectors being used for recording data. The embedded servo field typically comprises a synchronization portion, a track identifying portion for identifying a track number, and a track centering portion for locating the centerline of the track. When operating in a seek mode, the servo system causes the transducer to read the track identifying portion to determine the current track number, and adjusts the actuator trajectory accordingly. When operating in a track following mode, the servo system causes the transducer to read both track identifying portion and track centering portion, to determine a deviation from the desired track centerline, and the servo feedback system adjusts the position of the actuator to minimize the deviation.

The transducer head is an aerodynamically shaped block of material (usually ceramic) on which is mounted a magnetic read/write transducer. The block, or slider, flies above the surface of the disk at an extremely small distance (referred to as the "flyheight") as the disk rotates. The close proximity to the disk surface is critical in enabling the transducer to read from or write the data patterns in the magnetizable layer. Several different transducer designs are used. Many current disk drive designs employ a thin-film inductive write transducer element and a separate magneto-resistive read transducer element. The suspensions actually apply a force to the transducer heads in a direction into the disk surface. The aerodynamic characteristics of the slider counter this force, and enable the slider to fly above the disk surface at the appropriate distance for data access.

Description of Major Components

Referring to the Drawing, wherein like numbers denote like parts throughout the several views, FIG. 1 is a simplified drawing of a rotating magnetic disk drive storage device 100, for use in accordance with the preferred embodiment. Disk drive 100 comprises rotatable disks 101, which are rigidly attached to hub assembly or spindle 103, which is mounted on disk drive base or housing 104. Spindle 103 and disks 101 are driven by a drive motor at a constant rotational velocity in the counter-clockwise direction, when viewed from above as shown in FIG. 1. The drive motor (not visible in FIG. 1) is contained within hub assembly 103. Data is recorded on the top and bottom surfaces 102 of each disk. Actuator assembly 105 is situated to one side of disks 101. Actuator 105 rotates through an arc about shaft 106 parallel to the axis of the spindle, driven by electro-magnetic motor 107, to position the transducer heads. A cover (not shown) mates with base 104 to enclose and protect the disk and actuator assemblies. Electronic modules for controlling the operation of the drive and communicating with another device, such as a host computer, are mounted on circuit card 112. In this embodiment, circuit card 112 is shown mounted outside the enclosure formed by base 104 and the cover. However, the card 112 could also be mounted inside the head/disk enclosure, or a portion of the electronics may be mounted inside the enclosure, while another portion is mounted outside the enclosure. A plurality of head/suspension assemblies 108 are rigidly attached to the prongs of actuator 105. An aerodynamic slider 109 with a read/write transducer 110 is located at the end of each head/suspension assembly 108 adjacent disk surface 102.

While disk drive 100 is shown with two disks having multiple disk surfaces for recording, it should be understood that the present invention could utilize a drive having a single disk, or having a larger number of disks, and that it would be possible to employ only a single disk surface of a disk for recording data.

Figure 2:
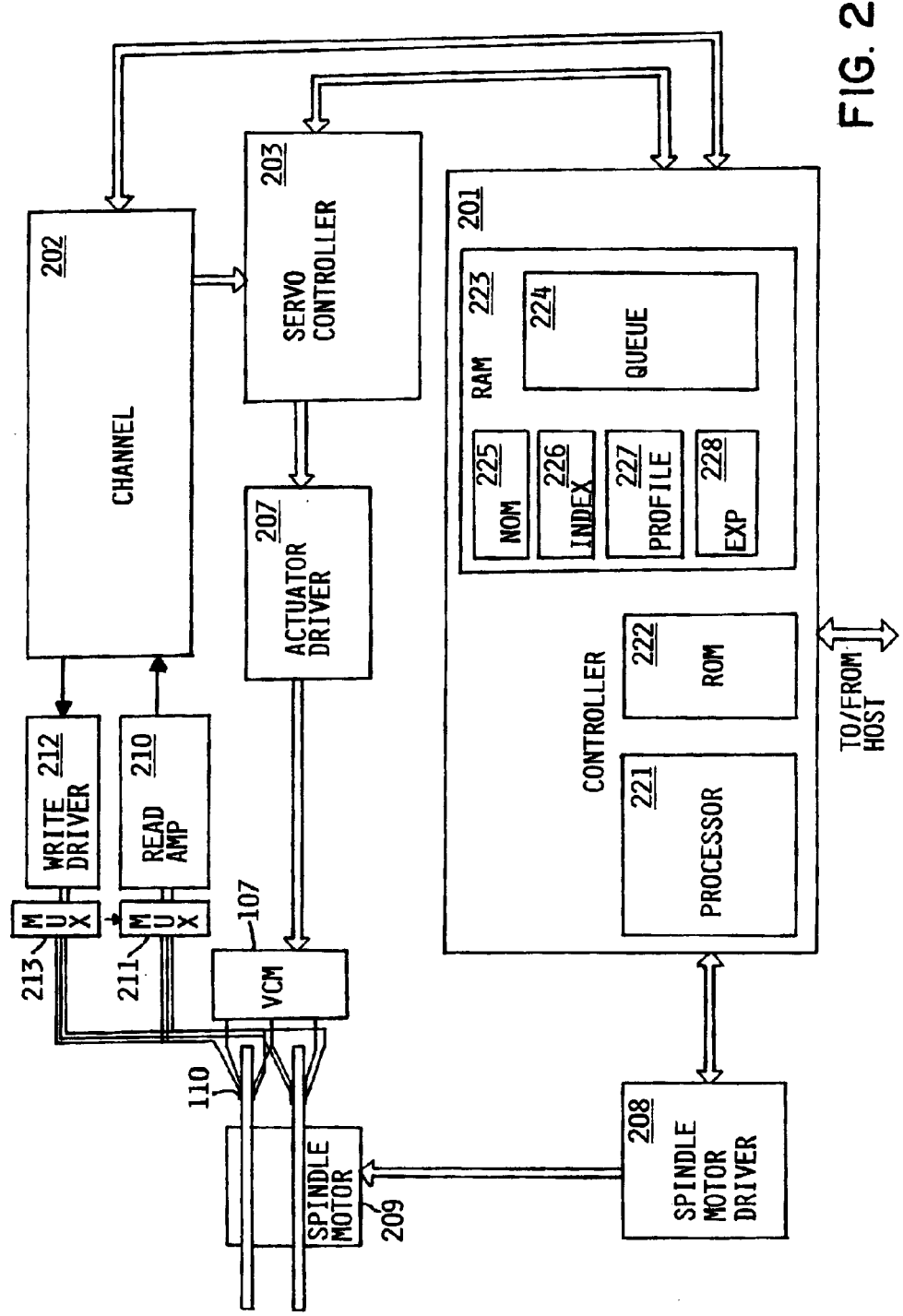
FIG. 2 is a high level diagram of the major electronic elements of a disk drive storage device, according to the preferred embodiment.

FIG. 2 is a high-level diagram of the major electronic elements of disk drive 100, showing how these are connected to one another and to the transducer heads, actuator motor and spindle motor, according to the preferred embodiment. File controller 201 provides a data interface to a host. The "host" is usually a computer system such as a desktop computer system or a mainframe computer system, although it may be a special purpose device such as a personal digital assistant (PDA), a digital controller for machinery such as an automobile or robot, or any of various other digital devices. Controller 201 also provides general control of the operation of disk drive 100, including such functions as command interpretation, sector mapping, power-up routines, diagnostics, error recovery, etc. In particular, file controller 201 selects enqueued data access operations for execution, as more particularly described herein. Channel electronics 202 provides modulation and demodulation function for data being written to and read from the disk surface. A servo controller 203 interprets servo signals obtained from reading servo fields on the disk to control the actuator motor (VCM 107); it also responds to seek signals from file controller 201. Spindle motor drive circuitry 208 provides drive current to spindle motor 209, driving the motor at a desired rotational velocity.

Transducers 110 are attached via lead wires to write multiplexer 213 and to read multiplexer 211, which are in turn coupled to write driver 212 and read amplifier 210, respectively. Read amp 210 provides input to channel electronics 202. Channel electronics provides input to write drive 212. Multiplexers 211 and 213 select one of the heads for writing or reading, responsive to control signal 214 from file controller 201. Magnetic patterns representing data or servo signals are sensed by magneto-resistive read elements in transducers 110, amplified by read amp 210, and provided to channel electronics 202. Channel electronics preferably includes a partial-response maximum likelihood (PRML) filter for decoding data signals into coherent data for use by a host system. When writing data, channel electronics 202 encodes data according to a pre-determined encoding format, and provides this data to write driver 212, which in turn drives current through an inductive write element to cause the data to be written on the disk surface.

Positioning of transducers 110 is achieved by a servo feedback loop system comprising transducers 110, read amp 210, channel electronics 202, servo controller 203, actuator driver 207, and actuator motor 107. Transducers 110 read servo fields recorded at periodic intervals on disk surfaces 101; these are amplified by read amp 210; channel electronics 202 separate the servo fields from user data; servo controller decodes servo signals received from channel 202 to identify the track and position error, determine actuator drive current need to follow or seek according to desired parameters, and provides actuator motor drive circuitry 207 with a signal indicating the necessary drive current. Actuator motor drive circuitry 207 in turn provides drive current to actuator voice coil motor (VCM) 107, positioning actuator 105 to a desired location (follow mode) or accelerating/decelerating the actuator in accordance with a desired profile (seek mode).

File controller 201 preferably includes programmable processor 221 which executes a control program resident in read-only memory (ROM) 222. ROM 222 is a non-volatile semiconductor random access memory, the contents of which are not lost when disk drive 100 is powered down. File controller also includes volatile read/write memory (RAM) 223. RAM 223 is used as a temporary cache for data being read from and written to one or more of the disk surfaces, and for storing internal state variables necessary for drive operation. In particular, RAM 223 includes a queue 224 of pending data access operations. RAM 223 further includes nominal seek time table 225, index table 226, seek profile table 227 and expansion table 228 for use in estimating access time of pending data access operations in queue 224, as more fully described herein. RAM 223 may include other data structures and storage allocations (not shown), such as a buffer for data read from a disk surface for sending to the host.

Although certain disk drive features are shown and described above, in particular separate magneto-resistive read and inductive write transducers elements, it should be understood that these are by way of describing the preferred embodiment only, and it would be possible to practice the present invention using different transducer elements or other alternative disk drive design features. It should further be understood that various electronic components such as file controller 201, channel 202, servo controller 203, etc. are shown in FIG. 2 as discrete entities for illustrative purposes, and that one or more of these may be combined as a single module, or may be embodied in multiple modules. In particular, elements of the controller 201 may in fact be implemented as a single module, or may be implemented as multiple modules. RAM 223 may be a single or multiple modules, and may use multiple storage technologies; e.g., a portion of RAM 223 may be static RAM, while another portion is dynamic RAM. It should further be understood that the preferred allocation of ROM and RAM is dependent in part of the cost of currently available technology, and that as memory technologies develop it may be preferable to use a single monolithic memory such as non-volatile RAM, or some other combination of memory technologies. It should further be understood that various disk drive components not essential to an understanding of the present invention have been omitted from FIGS. 1 and 2 for clarity of illustration.

Memory Description

RAM 223 is the general working storage used by controller 201. RAM 223 preferably contains a single addressable memory space, which may be allocated by controller 201 to various uses. A large part of RAM 223 is typically allocated for use as a read buffer (not shown), i.e., for temporarily storing data read from a disk surface and intended for transmission to a host. Another portion of RAM 223 is allocated for use as data access operation queue 224. Queue 224 stores pending data access operations received from a host. Preferably, both the read buffer and queue 224 are variable-sized allocations from RAM 223, allowing either one to use whatever memory space is available. In some implementations, queue 224 and the read buffer may be combined as a single data structure. In addition to the tables and structures specifically mentioned, RAM 223 further contains the dynamic working memory variables and data structures used by controller processor 221 to direct various aspects of control program execution not essential to an understanding of the present invention.

Queue 224 may be organized according to any of various formats, now known or hereafter developed. Queue 224 preferably contains, for each data access operation, an indication of the type of operation (read or write), and the disk surface (head), track number and sector number of the data access operation. Queue 224 also contains some indication of ordinality of the operation, i.e., when it was received by the host relative to other operations. Ordinality may be indicated by an operation sequence number which is incremented for each requested operation, or by a timestamp, or by some other means. This indication can be used to give some preference to stale operations in the queue.

In the preferred embodiment, the various tables 225–228 used for seek time estimation described below are in volatile RAM during drive operation, but since they are needed for optimal performance, they are stored in a non-volatile manner on a reserved area of the disk and loaded from the disk into RAM at power-up time. Tables which are dynamic should also be saved periodically to disk to preserve dynamic contents.

Various tables and computations described below express time as a number of SIDs. It will be observed that, for a disk rotating at a constant velocity and SIDs equally circumferentially spaced on the disk surface, the transducer head will pass over SIDs at constant time intervals, and therefore time may be measured as a number of SIDs. This measurement is convenient because it can be related directly to the latency period from one operation to another.

Figure 3:
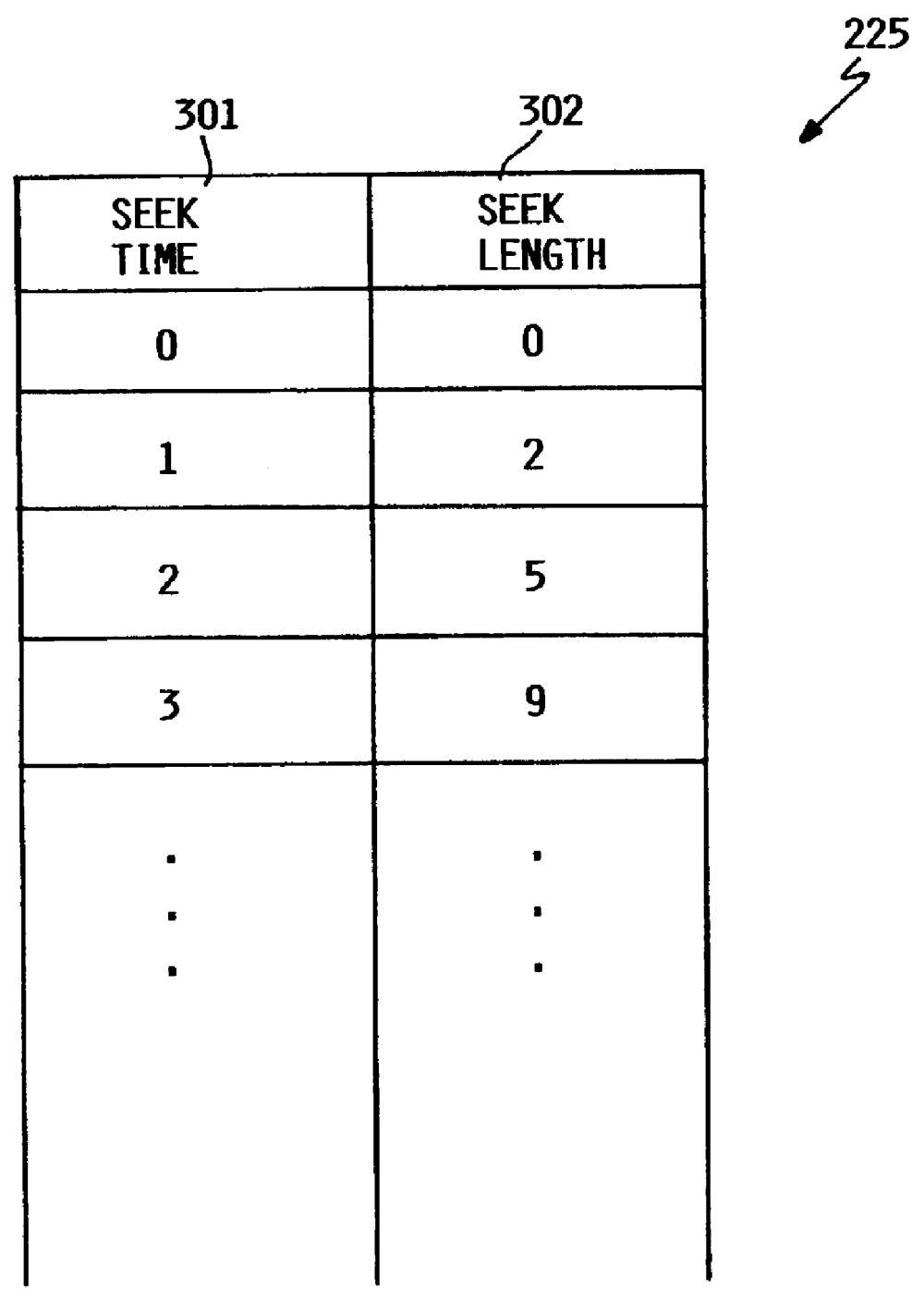

FIG. 3 illustrates at a conceptual level the general structure of nominal seek time table 225. Nominal seek time table 225 contains a plurality of entries, each entry containing a seek time 301 and a corresponding maximum seek length 302. Nominal seek time table 225 is intended to represent, for each seek time, an ideal maximum ("nominal") seek length corresponding to the seek time. Seek length is expressed in cylinders or tracks, the seek length being the absolute value of the difference between a track number of the actuator position before the seek and the track number of the desired data sector to which the actuator is moved in the seek operation. Seek time is expressed in SIDs. The ideal or nominal seek length is the best possible length of seek operation that one may expect to complete within a given seek time in disk drive 100. I.e., for a given seek time, the maximum possible seek length (for any combination of parameters which might affect seek time) is used as the nominal value in the table, and it is therefore assumed that it is not possible to seek a given length in less than the time corresponding to this seek length in the nominal seek time table. In the preferred embodiment, nominal seek lengths are parameter-independent (except for seek time). The data in nominal seek time table is preferably calibrated and updated on a dynamic basis using any of various methods, e.g., periodically collecting seek time statistics from actual seek operations during drive operation and determining table values from these statistics. Alternatively, nominal seek time table might contain static data which is calibrated to an individual disk drive at time of drive manufacture, or static data which is determined from disk drive testing during the design of a particular disk drive model, the table values being the same for all models of the disk drive. In the preferred embodiment, there are actually two separate nominal seek tables 225, one for read operations and the other for write operations. While it would be possible to use a single table for both read and write, the use of dual tables enables more efficient use of limited storage space in the profile table 227. Although table 225 is used in the preferred embodiment to establish nominal seek time values, this might alternatively be done using a mathematical formula or by other means.

FIG. 4 illustrates at a conceptual level the general structure of index table 226. Index table 226 is intended to express, for a given set of key parameter values, a corresponding probability profile for a seek operation. The corresponding probability profile is actually expressed in index table 226 as an index value into seek probability profile table 227. Any of various key parameter values may be used, as explained below.

Operation type (read or write): Seek time will depend on whether the operation is a read or a write. Typically, a write operation requires that the transducer head be positioned near track center to a greater degree of accuracy than a read operation. As a result, the time to "settle" on the track toward the end of the seek is longer for a write, hence the difference in seek time.

Head number: Seek time may vary with the transducer head and corresponding disk surface for any of various reasons. There are individual variations in head flyheight, transducer gain, physical size of the transducer, quality of the recording surface, and so forth, which might affect the amount of time required to settle on a target track to the extent that it can be reliably read or written to.

Seek direction: Due to various forces on the actuator, it may move faster depending on whether the seek is in the inward direction (toward the disk center) or the outward direction (toward the outer edge of the disk).

Radial head position: The actuator may seek faster at certain radial positions or zones than at others, so that a given seek length (in number of tracks) can be accomplished in a varying amount of time, depending on the range of tracks traversed. E.g., a 100-track seek near the inner diameter of the disk may take more time than a 100-track seek near the outer diameter of the disk, which may in turn take more time than a 100-track seek mid-way between the ID and OD. Actuators are generally designed for optimum use near the middle to the OD, so seeks in this range tend to be faster, although this is not necessarily always the case. Speed variations may be due to physical difference in actuator speed, or to the fact that tracks are formatted in such a manner that the number of track crossings per degree of actuator rotation varies across the disk surface, or both. The radial head position may be expressed as the position of the target track, or the initial track, or some other measure.

Drive Temperature: Temperature affects the air viscosity, which may affect the flyheight of the head as well as the air resistance to the actuator. Temperature may also affect lubricant viscosity, mechanical frictional forces and other factors, which may influence seek times.

The list of key parameters above is only one example of parameters which may be used, it being understood that additional parameters may be used, or that it is not necessary to use all of the parameters listed above. In the illustrated index table 226 of FIG. 4, only operation type, head number, seek direction, and radial head position are used as key parameters, it being understood that temperature or other parameters could be added by expanding the index table.

Index table 226 identifies, for each permutation of the key parameter values, an index number. This index number indexes an entry (illustrated as a row) in seek probability profile table 227, the entry defining a probability profile for one or more sets of key parameter values. Index table 226 is conceptually illustrated in FIG. 4 as a 2-dimensional array for clarity. For example, row 401 corresponds to the key parameter values H1/IN/R, meaning head number 1 ("H1"), seek direction inward toward the ID ("IN") and operation type read ("R"). Row 402 corresponds to the key parameter values H2/IN/W, meaning head number 2, seek direction inward, and operation type write. Column 403 corresponds to the seek target data sector lying in a cylinder in the range R through (2R−1), where R is some predetermined number of cylinders in each zone. Although Index table 226 illustrates a constant size cylinder range, it would also be possible to use variable size ranges, i.e., each column in table 226 representing a range having a different number of cylinders. Entry 404, which is at row 402 and column 403, represents the index value for the key parameters: Head number 2, inward seek, write operation, and target cylinder in the range R through (2R−1). The value "7" in the entry represents an index into a row in seek probability profile table 227, the corresponding row defining a probability profile for these key parameter conditions.

Figure 5:
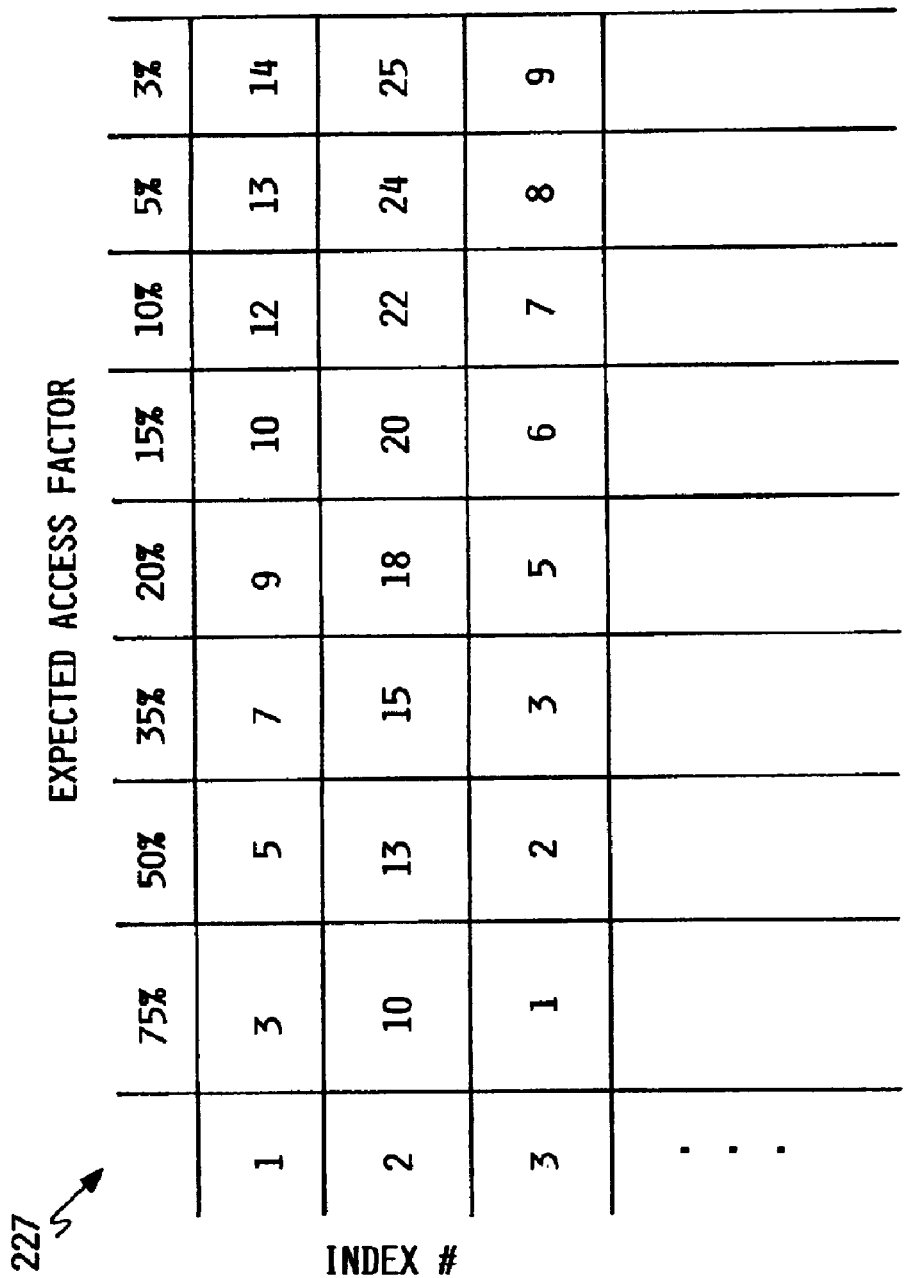
FIG. 5 illustrates the general structure of a seek probability profile table for estimating access times of enqueued operations, according to the preferred embodiment.

FIG. 5 illustrates at a conceptual level the general structure of seek probability profile table 227. Seek probability profile table contains a plurality of indexed entries (shown as rows), each of which defines a probability profile. Each entry or probability profile is associated with an index number which is used to access it, and contains a plurality of excess times over nominal (expressed as ΔSIDs), each excess time associated with an expected access factor (illustrated in FIG. 5 as a probability). An expected access factor for a given ΔSID expresses a probability that a seek operation will fail to complete within the ΔSID over nominal SID for the given length seek operation (from table 225), as explained in further detail below. Although FIG. 5 illustrates the expected access factors as percentages (probabilities), in fact the expected access factor may take other forms, as explained below with respect to FIG. 8.

Of significance is the fact that the number of index value entries in index table 226 (i.e., the number of permutations of the key parameters input values) is significantly greater than the number of probability profiles (rows) in seek probability profile table 227. This means that each row defining a probability profile in seek probability profile table 227 is typically used for multiple permutations of key parameter values. Such an arrangement allows one to specify a larger set of key parameter values than would be possible if a separate probability profile were required in storage for each respective permutation of key parameter values. For example, in a disk drive having 12 heads and divided into 16 concentric target cylinder range zones for purposes of key parameters, a total of 768 index entries are required in index table 226. Because these entries are only indexes which point to a row in seek probability profile table 227, each such entry may be stored as a single byte (or possibly even a half-byte), requiring only 768 bytes of storage. However, if a separate row of a probability profile were to be required for each such entry, the storage requirements would be 768 times the number of bytes in each row. The problem is compounded if the number of key parameter values is increased. The number of rows in seek probability profile table 227 need only be sufficient to hold a representative set of probability profiles, e.g., 16.

Figure 6:
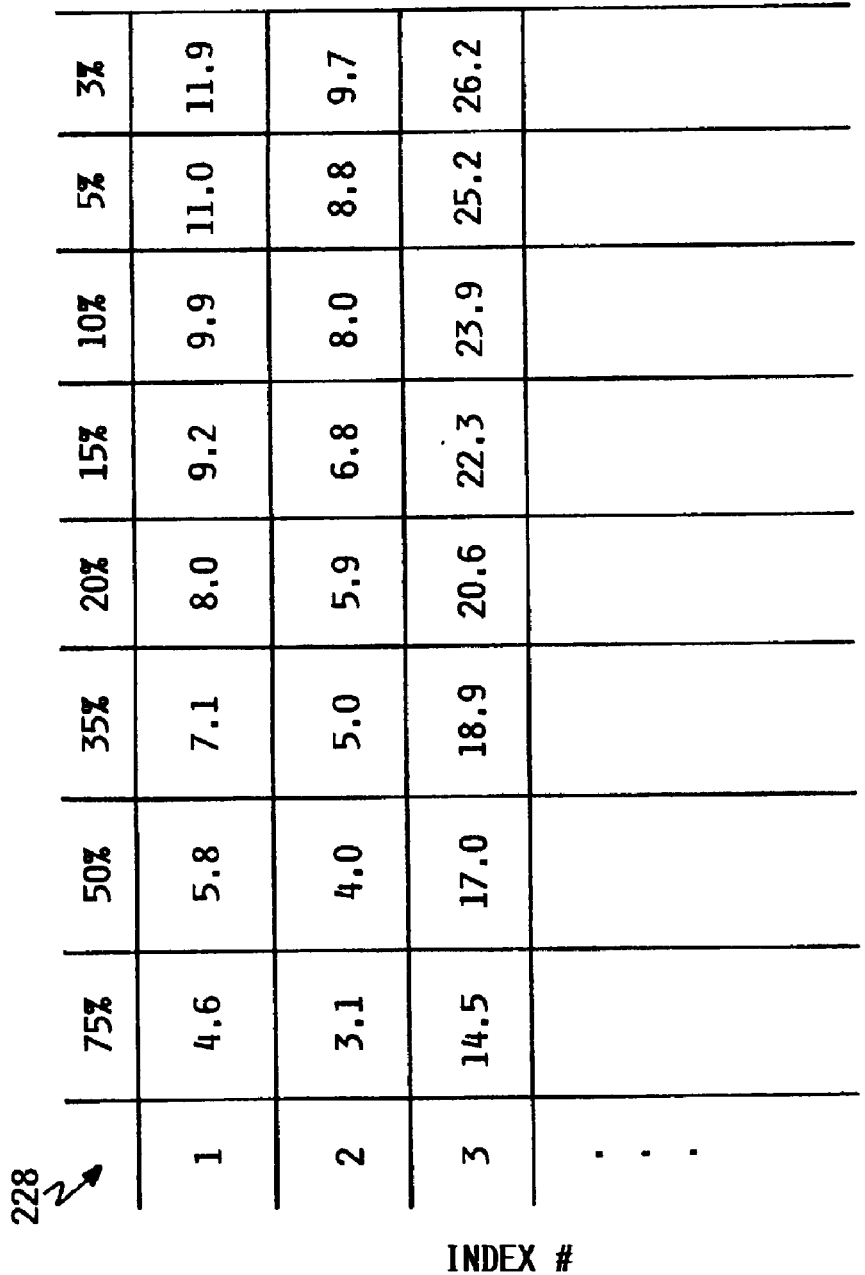
FIG. 6. illustrates the general structure of an expansion table for dynamically updating seek profile data, according to the preferred embodiment.

FIG. 6 illustrates at a conceptual level the general structure of expansion table 228. Expansion table 228 is used to dynamically update the values in seek probability profile table 227 and/or in index table 226. Expansion table 228 bears some similarity in structure to profile table 227, but the excess times are preferably expressed differently. Expansion table 228 contains a plurality of indexed entries (shown as rows), each of which contains statistics defining a seek probability profile. Each entry or seek probability profile contains a plurality of excess times (expressed as $\Delta$SIDs), each excess time associated with an expected access factor. Operating statistics are collected dynamically by incrementing or decrementing the excess time entries of expansion table 228, and after a sufficient testing interval, the statistics are used to update seek probability profile table 227 and/or index table 226. This process is explained in greater detail below. Expansion table 228 may contain only a small number of entries (e.g., 8), it being expected that it will be used to sample sets of parameter values on a rotating basis rather than collect exhaustive statistics of all data access operations.

The table representations of FIGS. 3–6 are used for clarity of illustration, and do not necessarily represent data organization in memory. The tables may be organized in any manner which will associate the various values to support rapid determination of a table entry, given the corresponding defining or parameter values.

Operation

In operation, a control program in ROM 222 executing on processor 221 causes the controller compute expected access time (EAT) and select disk operations from queue 224. The key parameters of a given data access operation are used to find an index from index table 226, and this index accesses an entry defining a probability profile in seek probability profile table 227. The probability profile indicated by the index value is used in conjunction with the nominal seek time to compute an expected access time for a given data access operation. The expected access times of different data access operations in queue 224 are compared to choose an operation for execution and removal from the queue. An asynchronous process (not shown) adds data access operations to queue 224 as they are received from a host.

Figure 7:
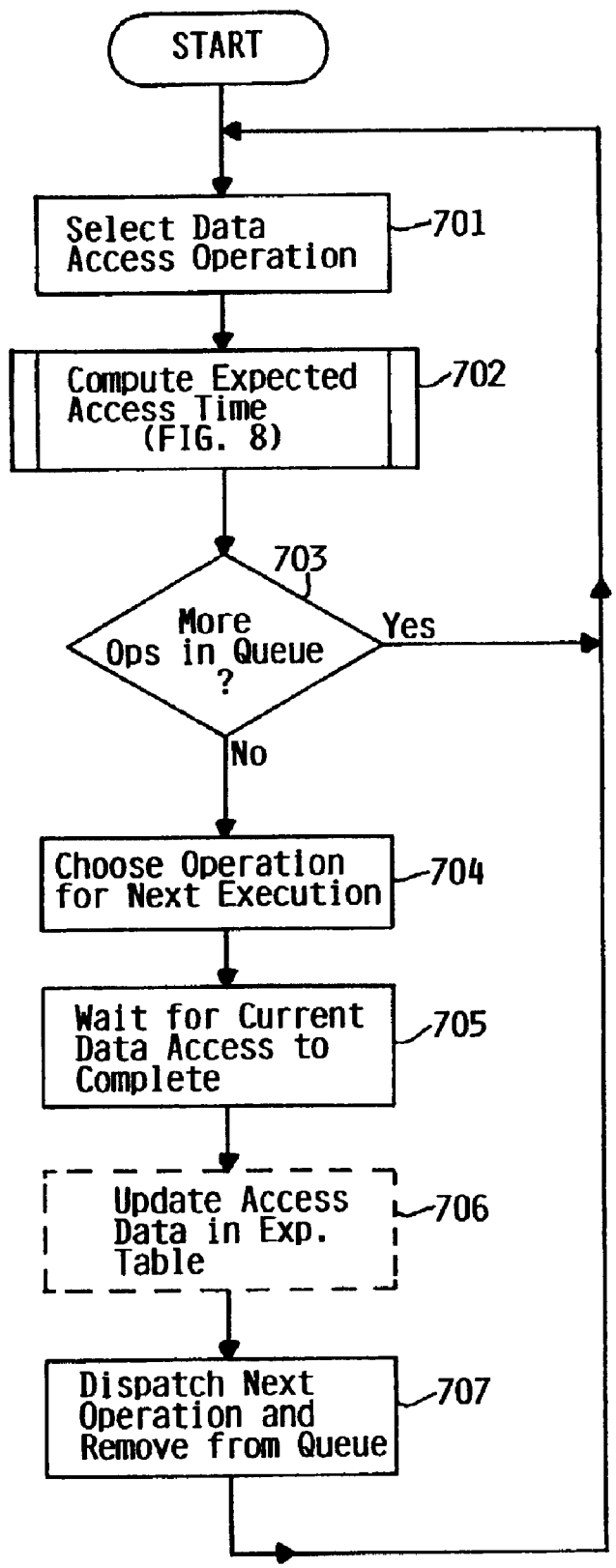
FIG. 7 is a high level flow diagram illustrating the process of choosing an enqueued data access operation for execution, according to the preferred embodiment.

FIG. 7 is a high level flow diagram illustrating the process by which disk controller 201 chooses a data access operation from queue 224 for access on disk 101. As shown in FIG. 7, the controller first selects an operation from the queue using any selection method that will traverse the entire queue (step 701). The expected access time of the operation is then computed. The step of computing expected access time is represented at a high level in FIG. 7 as step 702, and shown in greater detail in FIG. 8.

Figure 8:
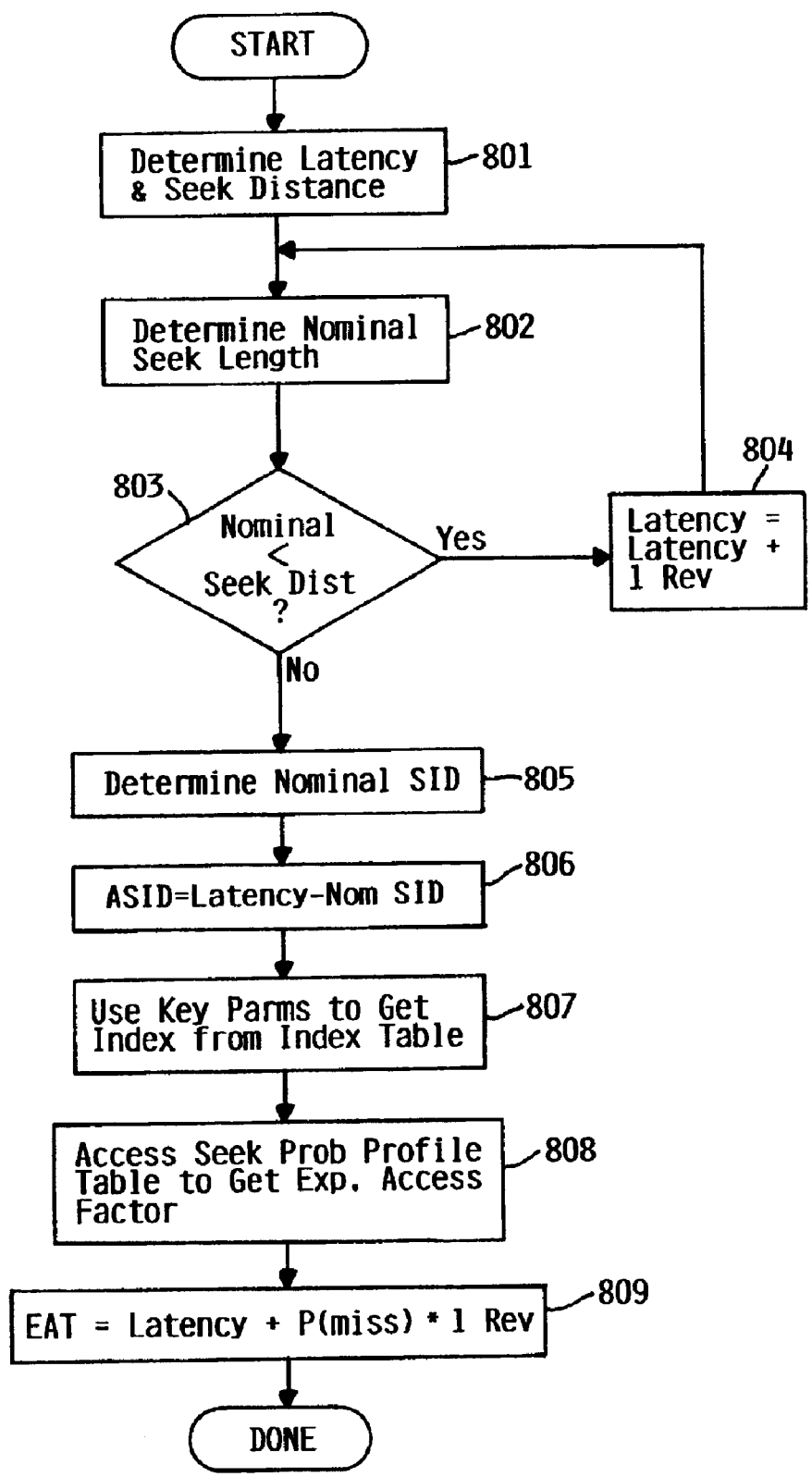
FIG. 8 is a flow diagram illustrating the process of calculating an expected access time for a give data access operation, according to the preferred embodiment.

Referring to FIG. 8, disk controller determines the latency (in SIDs) and the seek distance (in cylinders) for the selected data access operation by comparing its location with that of the currently executing data access operation (step 801). I.e., the latency is the number of SIDs between the end of the currently executing data access operation and the beginning of the selected data access operation, and the seek distance is the absolute value of the difference between the cylinder numbers of the two operations.

The disk controller then determines the nominal seek length (in cylinders) for the given latency by referencing nominal seek table 225 (step 802). I.e., this is considered the maximum possible seek distance given the available latency.

If the nominal (maximum) seek length is less than the seek distance (step 803), then it is impossible to complete a seek operation to the target data sector before the rotation of the disk has already moved the target data sector past the head. In this case, the head will have to wait another full revolution before it can read the target data. Therefore, the "Y" branch is taken from step 803, and the latency is incremented by the number of SIDs in a single full disk revolution (step 804). The control program then returns to step 802 to determine the nominal seek length for this new latency value.

If the nominal seek length is greater than or equal to the seek distance, the "N" branch is taken from step 803. Given the known seek distance, a nominal seek time corresponding to the known seek distance is then determined by backward table look up from table 225 (step 805).

The $\Delta$SID value is then computed as the difference between the latency and the nominal seek time (step 806). The $\Delta$SID value thus represents the "extra" time that a head would have to wait on the target track, assuming it performs a seek operation within the time allotted by the nominal seek value.

An index value corresponding to the key parameters of the selected data access operation is then obtained from index table 226 (step 807). I.e., in the illustrated table of FIG. 4, the head number, seek direction, operation type, and cylinder range of the target track are used to find the corresponding index value from table 226.

The index value obtained in step 807 is then used to reference a profile (row of entries) from probability profile table 227. From this profile, an expected access factor corresponding to the $\Delta$SID value computed in step 806 is determined (step 808).

The expected access time (EAT) of the selected data access operation is then computed according to the equation (step 809):

$$EAT = Latency + (Probability\_of\_miss * 1\_Revolution). \quad (1)$$

The Latency was derived at steps 801, 803 and 804. The remaining part of the formula is derived from the expected access factor, the derivation depending on the form in which the expected access factor is represented in memory. The expected access factor could be represented as a simple probability of miss (as shown in FIG. 5), in which case the remaining part of the formula is derived by multiplying the expected access factor from the table by the number of SIDs in a single disk revolution. However, in order to reduce the number of repetitive computations involved, it is preferred that the expected access factor be stored in memory as the product of the probability of miss and the number of SIDs in a single disk revolution. In this case, the expected access factor is simply added to the latency to obtain the EAT.

In a further alternative embodiment, table 227 might be represented in a "delta expected access time" form, in which a number of SIDs is the independent variable (index to the columns), and expected access factors or probabilities are the dependent variables (values in the rows). In a further variation of this alternative, it would be possible to store the expected access factor as a pair of values, being number of misses and number of accesses, wherein the probability of miss is computed as the ratio of misses to accesses, and is then multiplied by the number of SIDs in a single disk revolution; although this alternative requires more computation, it allows access miss statistics to be kept on a continuing basis for all disk accesses.

With the EAT of the selected access operation computed, the controller then determines if there are additional access operations in the queue (step 703), and if so, returns to step 701 to select another operation and compute its EAT. When the EATs of all enqueued operations have been computed, the "N" branch is taken from step 703.

The controller then chooses an enqueued operation for execution after the currently executing operation (step 704). Any of various algorithms which in some way use the EAT values may be used. As a simple example of an algorithm, the controller may choose the operation having the lowest EAT value in all cases, and in the case of a tie, may choose the oldest operation in the queue. However, this algorithm may have a tendency to starve certain types of operations. E.g. an operation near the ID of the disk may sit on the queue a long time because the actuator is executing many data access operations nearer the OD having lower EATs. An alternative algorithm would establish relative priorities, in which both the EAT and the time in the queue are taken into account by giving a relative weight to each, so that a stale operation with a higher EAT may in some cases be selected. More sophisticated algorithms which take additional factors into account may be used. Examples of such additional factors might be: (a) favor reads over writes; (b) favor operations near the periphery of the disk (ID or OD), because they tend to get neglected; (c) favor maintaining same seek direction as previous seek (to encourage sweeps); (d) favor short ops if buffer nearly full; etc. Finally, although the algorithm described herein looks only at the very next operation, it would be possible to look ahead more than one operation from the currently executing one to find optimal sequences of operations.

After choosing the next operation, the controller waits for the current data access to complete (step 705). If data access statistics are being kept (in the expansion table 228 or elsewhere), these statistics are updated depending on the result (miss or make) of the current data access operation (step 706). This step is illustrated as a dashed box in FIG. 7, because statistics are not necessarily always being generated. The data access operation chosen at step 704 is then dispatched for execution and removed from queue 224 (step 707). The controller then returns to step 701 to determine the next operation to be executed.

Preferably, tables described above are individually and dynamically calibrated to disk drive 100. Any of several methods for doing so may be employed, of which two are described herein.

In a preferred embodiment, the values in seek probability profile table 227 are determined by the disk drive designers and are fixed for a particular model of disk drive. I.e., the drive designers experimentally determine a representative sample of probability profiles for inclusion in table 227. Calibration of the drive then amounts to determining maximum seek length values for nominal seek time table 225 (as described earlier), and determining index values for index table 226 which will point to the appropriate rows in table 227.

Determining index values is accomplished by using expansion table 228. Specifically, a set of key parameter values is temporarily assigned to one of the rows of expansion table 228, and the ΔSID values for the set of key parameters are experimentally determined by collecting data from a sufficient number of data access attempts. In the preferred embodiment, ΔSID values are determined by convergence using a convergence formula for each probability in the table. I.e., in the column entry corresponding to 75% miss probability, the ΔSID value is incremented by $0.25\mu$ for every attempted data access operation of the set of key parameters which misses (does not complete the seek within the value of ΔSID), and is decremented by $0.75\mu$ for every such data access operation which makes (completes the seek within ΔSID), where $\mu$ is some artificial unit. A similar procedure (with appropriately varying coefficients) is used for each of the other column entries. Over a sufficient number of attempts, the values of ΔSID in each column will converge on stable values, which are the experimentally determined values of ΔSIDs. The artificial unit $\mu$ may start out larger and become increasingly smaller for rapid convergence, or may be a constant size. It is expected that $\mu$ ultimately becomes the equivalent of less than 1 SID in order to have table convergence. In the representation of FIG. 6, the values in expansion table are illustrated as floating point values; however, for ease of computation, these could be integers representing a SID value times a multiplier, and which are divided by the common multiplier after convergence has completed. Once a sufficient time has elapsed for convergence of the ΔSID values in a row of expansion table 228, these values from the row of the expansion table are compared to each row of seek probability table 227. The closest match is chosen as the appropriate index value for the set of key parameters, and this index number is entered in index table 226 corresponding to the set of key parameter values used to generate the statistics in the row of expansion table 228.

Expansion table 228 has multiple rows to permit the collection of convergence data for multiple key parameter permutations simultaneously, but it is expected that the number of rows in expansion table 228 is less than the number of possible permutations. Therefore, convergence data is collected for the various permutations on a rotating basis, which is not necessarily equal. In the preferred embodiment, permutations are chosen for expansion in expansion table on the basis of frequency of access. I.e, counts of data access operations actually performed for each permutation are accumulated, and the most frequently performed permutations are updated in the expansion table more often. This may be done according to any of various algorithms, but in simple embodiment, the permutations having the largest counts are chosen for collecting convergence data in the expansion table, the counts for the chosen permutations being reset. It would alternatively be possible to choose permutations for expansion on a round-robin basis or according to other formulae.

In an alternative embodiment for calibration, seek probability profile table 227 is also calibrated using operating statistics. As in the preferred embodiment, ΔSID values are dynamically determined by convergence in expansion table 228 for various permutations of key parameters. However, experimentally determined values for particular key parameter permutations are entered in the rows of table 227. When rows are filled from a representative set of key parameter permutations, the remaining permutations are matched to the filled rows in the same manner as they would have been for pre-filled rows. It is possible to continually adjust the values in the rows on a dynamic basis.

Additional variations of the above calibration procedures or different calibration procedures are possible. For example, instead of loading all disks with initial values fixed at design time, the drives can be individually calibrated and loaded as part of a manufacturing process, before shipment to the customer. Other variations would also be possible.

It will be understood that disk drive operations unrelated to estimated access time computation and selection of a next operation from the queue have not been described in detail above or shown in the figures. In fact, a disk drive typically performs multiple concurrently executing tasks, of which selection of an operation from the queue is only one. A typical disk drive responds to many different types of commands; responsive behavior may be very complex; exchange of information with the host may require many steps; etc. These details have been omitted from the description herein for clarity of illustration.

Additional Considerations

In general, the routines executed to implement the illustrated embodiments of the invention, whether implemented as part of an operating system or a specific application, program, object, module or sequence of instructions are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning digital devices such as disk drives, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Examples of signal-bearing media are illustrated in FIG. 1 as disk surface 102, in FIG. 2 as ROM 222.

Although a particular estimated access time algorithm has been disclosed which relies on probability of miss or make for given parameter combinations, other algorithms are known in the art for estimating seek times, and consistent with the present invention, a seek profile table accessible using an index table from key parameter permutations might contain values, from which access estimates can be formulated, other than probabilities of miss/make as used in the TREAT algorithm of the preferred embodiment. In particular, it would alternatively be possible to use a "delta expected access time" algorithm.

In the preferred embodiment, the servo track formatting as described herein is employed in a rotating magnetic rigid disk drive device, in which disks are permanently installed in the drive. However, such a formatting could alternatively be used in a removable disk having a rigid or non-rigid substrate and data recorded in tracks on its surface.

In the preferred embodiment, the data recording tracks are concentric. However, as is known in the art, the tracks could also be spiral tracks.

Although a specific embodiment of the invention has been disclosed along with certain alternatives, it will be recognized by those skilled in the art that additional variations in form and detail may be made within the scope of the following claims:

What is claimed is:

1. A rotating magnetic disk drive data storage device, comprising:
   a disk drive base;
   a rotatably mounted disk and spindle assembly, said disk and spindle assembly comprising at least one rigid disk for recording magnetically encoded data on at least one surface of said at least one rigid disk;
   a movable actuator supporting at least one transducer head, said actuator positioning said at least one transducer head to access said magnetically encoded data on said at least one surface of said at least one rigid disk;
   a controller for controlling the operation of said disk drive data storage device, said controller maintaining a queue of data access operations and selecting operations for execution from said queue according to an estimated access time of the respective operations, said controller accessing a seek profile table and an index table, said seek profile table containing a plurality of entries, each entry corresponding to a respective seek profile, and said index table containing a plurality of entries, each entry corresponding to a respective set of access operation parameter values and containing a value indexing an entry in said seek profile table corresponding to said respective set of access operation parameter values;
   wherein said controller estimates said access time of a data access operation by: (a) accessing the index table entry corresponding to the respective set of access operation parameter values, (b) using the value of the index entry to determine the corresponding seek profile table entry, and (c) using the corresponding seek profile table entry to estimate the access time.

2. The rotating magnetic disk drive data storage device of claim 1, wherein said moveable actuator supports a plurality of transducer heads, each head accessing magnetically encoded data on a respective surface of said at least one rigid disk, and wherein each said set of access operation parameter values includes a value corresponding to a transducer head for performing the corresponding data access operation.

3. The rotating magnetic disk drive data storage device of claim 1, wherein each said set of access operation parameter values includes a value corresponding to a direction of actuator motion of a seek operation for the corresponding data access operation.

4. The rotating magnetic disk drive data storage device of claim 1, wherein each said set of access operation parameter values includes a type of data access operation.

5. The rotating magnetic disk drive data storage device of claim 1, wherein each said set of access operation parameter values includes a temperature of said rotating magnetic disk drive data storage device.

6. The rotating magnetic disk drive data storage device of claim 1, wherein said controller dynamically updates values in said index table.

7. The rotating magnetic disk drive data storage device of claim 1, wherein said controller estimates said access time by further (d) determining a seek distance and a required latency, (e) determining a nominal seek time corresponding to said seek distance, and (f) determining an excess seek time as a difference between said required latency and said nominal seek time, wherein said excess seek time is used when using the corresponding seek profile table entry to estimate the access time.

8. The rotating magnetic disk drive data storage device of claim 7, wherein said controller estimates the access time according to a time-based relocation expected access time algorithm.

9. A method of operating a disk drive data storage device, comprising:

maintaining a queue of data access operations for execution;

for a plurality of data access operations on said queue, determining a respective estimated access time by:

(a) accessing a respective entry in an index table corresponding to a set of access operation parameter values of the corresponding data access operation on said queue, said index table containing a plurality of entries, each entry corresponding to a respective set of access operation parameter values and containing a value indexing an entry in a seek profile table, each ently in said seek profile table containing a respective seek profile;

(b) using the value of the index entry to determine the corresponding seek profile table entry, and (c) using the corresponding seek profile table entry to estimate the access time of the corresponding data access operation; and selecting one of said plurality of data access operations on said queue for execution based on said estimated access time of the data access operation.

10. The method of operating a disk drive data storage device of claim 9, wherein said disk drive includes a moveable actuator supporting a plurality of transducer heads, each head accessing magnetically encoded data on a respective disk surface of said disk drive, and wherein each said set of access operation parameter values includes a value corresponding to a transducer head for performing the corresponding data access operation.

11. The method of operating a disk drive data storage device of claim 9, further comprising the step of dynamically updating values in said index table.

12. The method of operating a disk drive data storage device of claim 11, wherein said step of dynamically updating values in said index table comprises:

(a) selecting sets of access operation parameter values for use in dynamic update of an expansion table;

(b) dynamically determining a respective seek profile in said expansion table for each respective set of access operation parameter values selected by said step of selecting sets of access operation parameter values;

(c) matching each dynamically determined seek profile in said expansion table with a corresponding seek profile in said seek profile table; and (d) updating entries in said index table corresponding to each respective set of access operation parameter values selected by said step of selecting sets of access operation parameter values to index the respective corresponding seek profile in said seek profile table.

13. The method of operating a disk drive data storage device of claim 12, wherein said step of selecting sets of access operation parameter values for dynamic update comprises selecting sets of access operation parameter values based on frequency of executed data access operations corresponding to the respective sets of access operation parameter values.

14. The method of operating a disk drive data storage device of claim 11, wherein said step of dynamically updating values in said index table comprises dynamically determining respective seek profiles corresponding to selected sets of access operation parameter values by convergence of operationally collected data on each respective seek profile.

15. The method of operating a disk drive data storage device of claim 9, wherein said step of, for a plurality of data access operations on said queue, determining a respective estimated access time, further comprises the steps of:

(d) determining a seek distance and a required latency;

(e) determining a nominal seek time corresponding to said seek distance; and (f) determining an excess seek time as a difference between said required latency and said nominal seek time, wherein said excess seek time is used when performing said step of using the corresponding seek profile table entry to estimate the access time of the corresponding data access operation.

16. The method of operating a disk drive data storage device of claim 15, wherein said step of using the corresponding seek profile table entry to estimate the access time estimates the access time according to a time-based relocation expected access time algorithm.

17. A control program product for a disk drive data storage device, comprising:

a plurality of processor-executable instructions recorded on signal-bearing media, wherein said instructions, when executed by a processor of said disk drive, cause the drive to perform the steps of:

maintaining a queue of data access operations for execution;

for a plurality of data access operations on said queue, determining a respective estimated access time by:

(a) accessing a respective entry in an index table corresponding to a set of access operation parameter values of the corresponding data access operation on said queue, said index table containing a plurality of entries, each entry corresponding to a respective set of access operation parameter values and containing a value indexing an entry in a seek profile table, each entry in said seek profile table containing a respective seek profile;

(b) using the value of the index entry to determine the corresponding seek profile table entry, and (c) using the corresponding seek profile table entry to estimate the access time of the corresponding data access operation; and selecting one of said plurality of data access operations on said queue for execution based on said estimated access time of the data access operation.

* * * * *